(12) United States Patent
Goodjohn et al.

(10) Patent No.: US 6,768,905 B2
(45) Date of Patent: Jul. 27, 2004

(54) METHOD AND PROCESSOR FOR DETERMINING LOADING OF A TELECOMMUNICATIONS SYSTEM AND APPLICATIONS OF THE SYSTEM-LOADING DETERMINATION

(75) Inventors: Paul Goodjohn, Lynchburg, VA (US); Eugene H. Peterson, III, Forest, VA (US)

(73) Assignee: M/A-Com Private Radio Systems, Inc., Lynchburg, VA (US)

( * ) Notice: Subject to any disclaimer, the term of this patent is extended or adjusted under 35 U.S.C. 154(b) by 330 days.

(21) Appl. No.: 09/682,191

(22) Filed: Aug. 3, 2001

(65) Prior Publication Data

US 2003/0027580 A1 Feb. 6, 2003

(51) Int. Cl.[7] ................................................. H04Q 7/20
(52) U.S. Cl. ........................ 455/423; 455/425; 455/453
(58) Field of Search ................................ 455/453, 423, 455/425, 510

(56) References Cited

U.S. PATENT DOCUMENTS

| | | | |
|---|---|---|---|
| 4,534,061 A | | 8/1985 | Ulug |
| 5,293,641 A | * | 3/1994 | Kallin et al. ................ 455/453 |
| 5,483,670 A | | 1/1996 | Childress et al. |
| 5,636,223 A | * | 6/1997 | Reardon et al. ............ 370/431 |
| 5,749,055 A | * | 5/1998 | Dahlin ....................... 455/453 |
| 6,108,551 A | | 8/2000 | Lehmusto et al. |
| 6,169,880 B1 | | 1/2001 | LaFratta et al. |
| 6,272,315 B1 | * | 8/2001 | Chang et al. .............. 455/13.1 |
| 6,456,850 B1 | * | 9/2002 | Kim et al. .................... 455/453 |
| 2001/0034235 A1 | * | 10/2001 | Froula ......................... 455/446 |
| 2002/0077111 A1 | * | 6/2002 | Spaling et al. .............. 455/453 |
| 2002/0115442 A1 | * | 8/2002 | Dorenbosch ................ 455/446 |
| 2003/0017831 A1 | * | 1/2003 | Lee et al. .................... 455/453 |

OTHER PUBLICATIONS

EDACS Explained—Com–Net Ericsson Critical Radio Systems.

* cited by examiner

*Primary Examiner*—Edward F. Urban
*Assistant Examiner*—Duy K Le
(74) *Attorney, Agent, or Firm*—Enrique J. Mora, Esq.; Beusse, Brownlee, Wolter, Mora & Maire, P.A.

(57) ABSTRACT

Method and processor for determining loading of a communications system shared by a plurality of user-terminals are provided. The method allows a respective terminal for monitoring a control channel including logical messages therein. The monitoring of the messages in the control channel is performed regardless of whether or not the logical messages therein are specifically addressed to that terminal. The method further allows for estimating a parameter indicative of system loading based on information in the monitored logical messages.

28 Claims, 4 Drawing Sheets

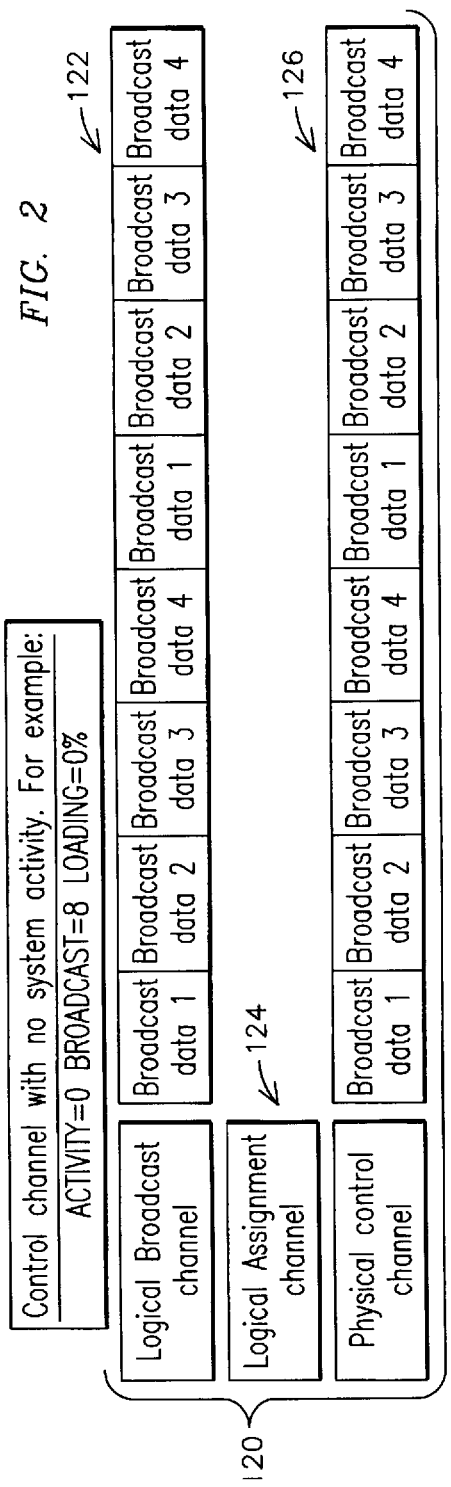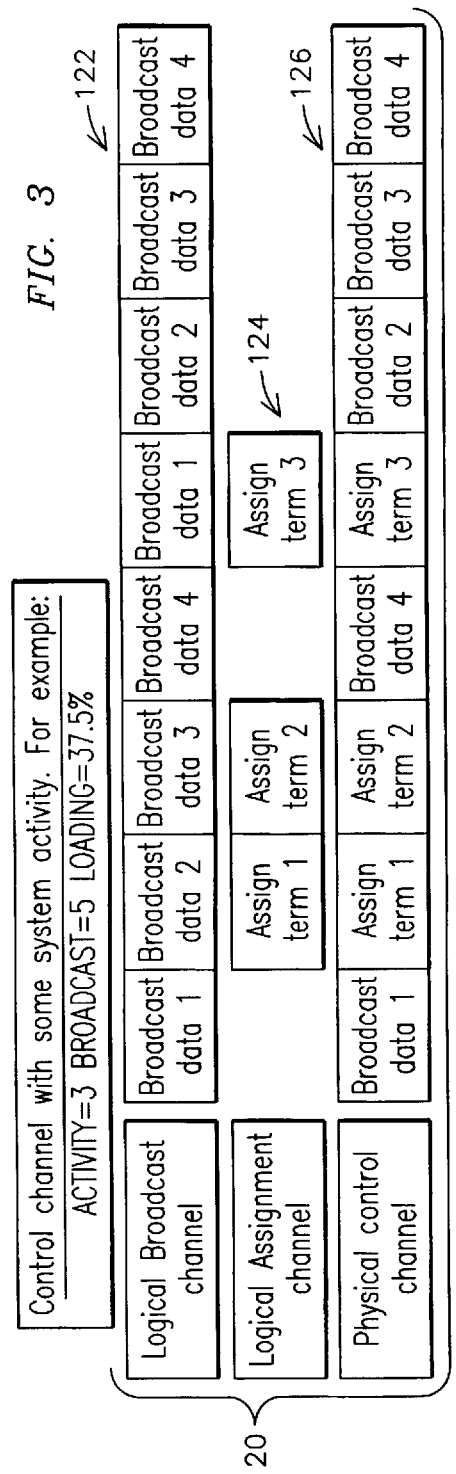

METHOD AND PROCESSOR FOR DETERMINING LOADING OF A TELECOMMUNICATIONS SYSTEM AND APPLICATIONS OF THE SYSTEM-LOADING DETERMINATION

BACKGROUND OF INVENTION

The present invention is generally related to telecommunication systems, and, more particularly, to techniques for determining loading of a communications system, such as may shared by a plurality of user terminals.

Telecommunication network systems, including by way of example, cellular communication systems, such as Advanced Mobile Phone Service (AMPS) and Global System for Mobile Communications (GSM); and trunking systems, such as Enhanced Digital Access Communication Systems (EDACS), are conceptually made up of a number of communication or radio "channels" which may be either a physical pair of radio frequencies, or a logical collection of data bursts. These channels are arranged as inbound and outbound communications paths to and from a repeater, or base station. One channel is usually designated as a control channel, with digital control messages being transmitted continuously from the repeater, the remaining channels being designated as working or traffic channels.

Under presently known techniques, a terminal on the communication system would decode the control channel, and then evaluate the messages that are specifically directed or addressed to that terminal, and discard all other messages. That is, messages not addressed to that terminal are discarded.

When accessing the system in order to transfer a periodic message or update, the terminal will attempt an access. In general, there are three basic responses the terminal can receive: 1) A channel assignment, in which case the terminal will proceed with the transaction; 2) An indication that the system is busy (a channel or some other necessary resource is unavailable at that time), in which case the terminal will reattempt the access later; or 3) no response, in which case the terminal will assume that there was a collision between the data transmitted by that terminal to the base station and some other transmission. Typical system-states corresponding to the foregoing responses respectively are: 1) The system is relatively unloaded; 2) The working channel load is limiting communication; and 3) The inbound control channel load is limiting communication. The latter two states are the ones of primary interest in the loading design of a communications system.

A typical communications system has peak loading periods that the system has to be designed for, and during the majority of the other times the system capacity may be substantially underutilized. For a system that has the vast majority of their calls at essentially the same relative priority, that would be the end of the story in terms of practical utilization of any systematic loading optimization. The system would have to be designed for the worst case, and the peak loading contention would be resolved by queuing calls and automated retrying if a signaling collision occurs.

New and existing technologies are finding ever-increasing applications in communications systems which, when implemented, can provide useful but not necessarily critical information to the system users. The drawback of some of these applications is a tremendous increase in system loading that is relatively independent of the time of day. Under present system loading contention practices, this increased loading can detrimentally impact both non-critical (lower priority) and critical (high priority) communications and result in unacceptable access time for communication of critical messages.

Presently available techniques for determining the level of activity on a cellular communications system generally require the inclusion of dedicated software and messaging into each base station of the system, and further require the inclusion of appropriate information transport into the over-the-air channel protocols. Unfortunately, under these prior art techniques, the implementation of the system loading software within the infrastructure components (base stations, switches, control systems, etc.) is highly complex, time consuming, and, consequently, these implementations generally require the allocation and consumption of costly and scarce resources. As suggested above, this software must be in place on all of the base stations within a network in order to realize any benefit from the system loading determination. Finally, it is unfeasible and/or impractical to implement such prior art techniques on an already deployed communications system, without changing the installed software, which in some instances may well no longer be supported or maintained.

Thus, it would be desirable to provide techniques for determining the level of activity on a cellular communications system that are not subject to the above-described disadvantages. For example, it would be desirable to determine the level of activity on a given communications system by observing the overall control channel utilization. More particularly, it would be desirable to make such a system-loading determination by utilizing information, which, although already available to respective terminals in the system, under prior art techniques, would have been discarded or ignored. That is, it would be desirable to use system information for determining system loading regardless of whether or not that information is specifically addressed to a respective terminal, e.g., any terminal attempting to access the system. This previously discarded information could be used to give a measure of the system loading by observing the activity level on the controlling channel. This system loading information has significant value in the initiation of non-critical transactions that occur over a given communications system, such as vehicle position updates, periodic equipment status messages, etc. This allows a degree of prioritization to be performed by the terminal equipment without the necessity for changes in the infrastructure hardware or software, and/or complex information gathering, which could further burden the load of the system.

SUMMARY OF INVENTION

Generally, the present invention fulfills the foregoing needs by providing in one aspect thereof, a method for determining loading of a communications system shared by a plurality of user-terminals. The method allows a respective terminal to monitor a control channel including logical messages therein. The monitoring of the messages in the control channel is performed regardless of whether or not the logical messages are specifically addressed to that terminal. The method further allows for estimating a parameter indicative of system loading based on information extracted from the monitored logical messages.

The present invention further fulfills the foregoing needs by providing in another aspect thereof, a processor for determining loading of a communications system shared by a plurality of user-terminals. The processor includes a radio channel monitor configured to monitor in a respective terminal a control channel including logical messages therein. The monitor is further configured to monitor logical messages in the control channel regardless of whether or not the logical messages are specifically addressed to that terminal. An estimator is configured to estimate a parameter indicative of system loading based on information supplied by the radio channel monitor.

BRIEF DESCRIPTION OF DRAWINGS

The features and advantages of the present invention will become apparent from the following detailed description of the invention when read with the accompanying drawings in which:

FIGS. 2–4 respectively illustrate a conceptual representation of the control channel of the system of FIG. 1 under various exemplary system-loading scenarios, and including "logical" messages, such as broadcast messages and an assignment or activity messages, that may be monitored by a user terminal regardless of whether or not such messages are specifically addressed to that terminal.

DETAILED DESCRIPTION

Figure 1:
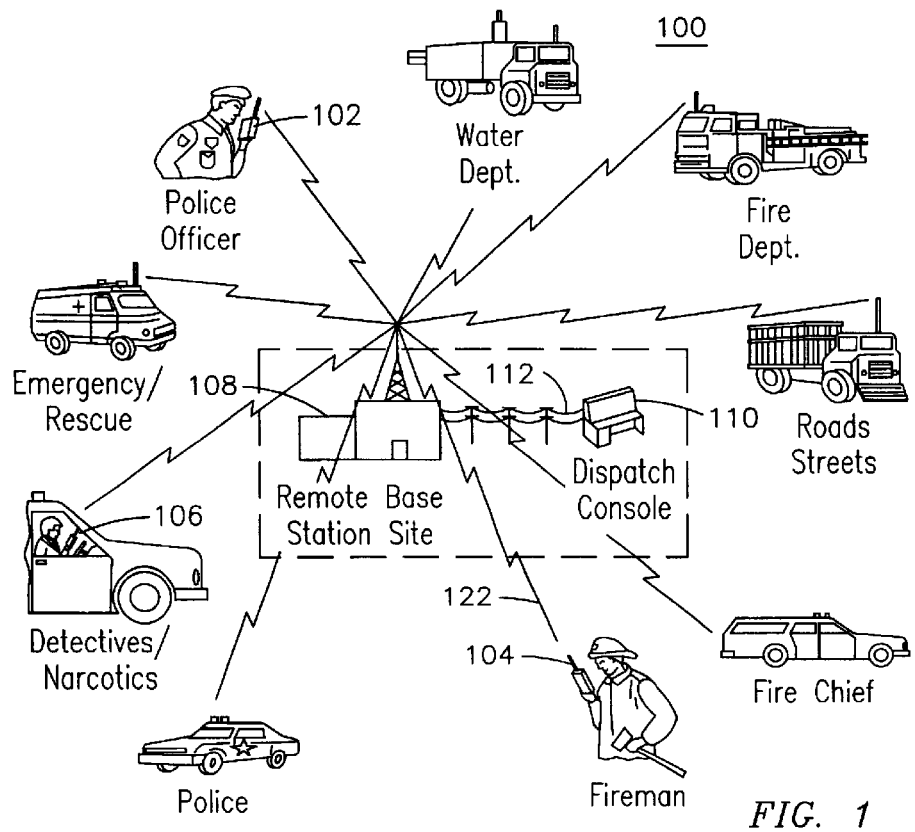
FIG. 1 shows one example of a telecommunications system using a control channel and/or working channels whose loading may be determined in accordance with aspects of the present invention.

An exemplary trunked communications system 100 that may benefit from the teachings of the present invention is generally depicted at FIG. 1. As illustrated, individual units or user terminals, e.g., terminals 102, 104, and 106, of various user-groups communicate with each other (both within and possibly outside of their own group) via shared radio channels through a base station 108 or repeater.

A dispatch console 110 may be housed directly at the base station site 108 or may be remotely located and interconnected to the base station via a suitable communications infrastructure 112, as will be readily understood by those skilled in the art. There may also be multiple dispatch consoles 110 (e.g., one for each separate fleet) and a master or supervisory dispatch console for the entire system as will also be understood by those skilled in the art. As suggested above, system 100 generally employs two types of radio channel designations: One of them is a control channel 120 (FIGS. 2–4), and the other is a working channel, as exemplified by the working channel 122 that carries all voice and/or data communications from/to terminal 104 in FIG. 1. In general, the designation of working channel applies to each of the remaining radio channels in the system. That is, any radio channel, other than the single control channel, is designated as a working channel. Each terminal on the communication system receives and decodes the control channel, which includes all the assignments for terminals in the base station's coverage area. Additionally, the control channel includes broadcast information, such as access information for the site, and identification of the network, etc. The broadcast information is used as part of initialization procedures for locating the network, and accessing it using techniques that are readily known to those skilled in the art, and need not be described in any greater detail for purposes of the present invention.

Figure 4:
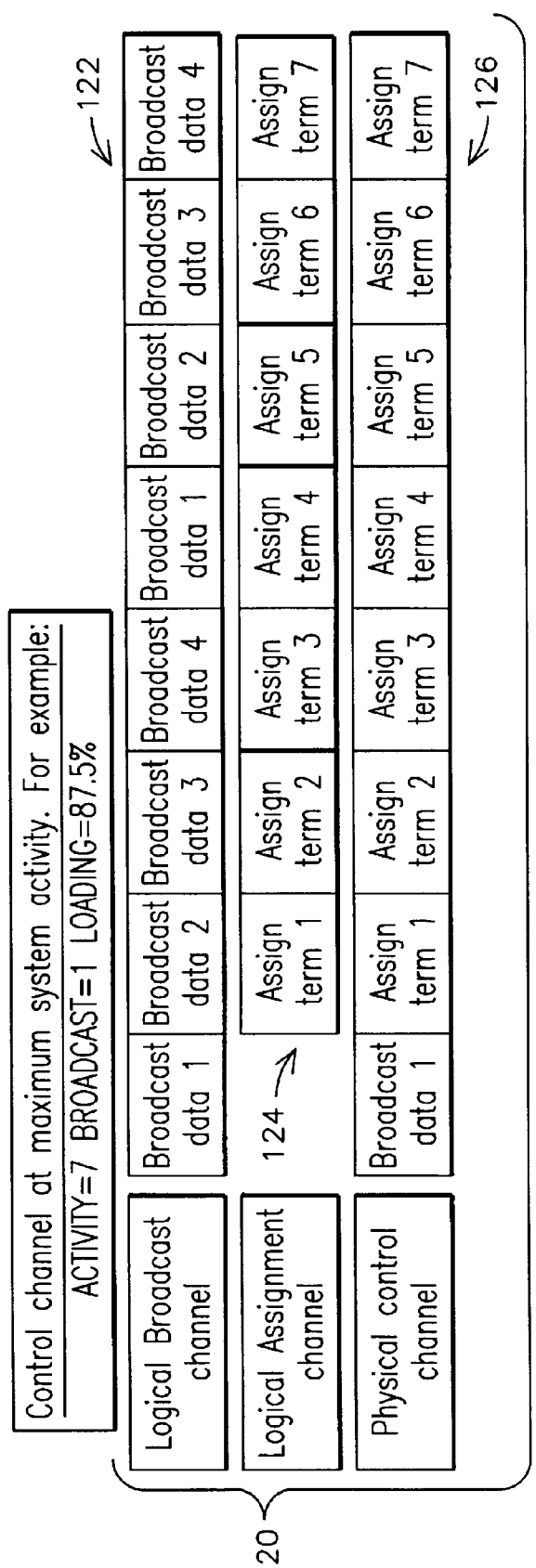

As illustrated in FIGS. 2–4, the control channel 120 can be conceptualized as comprising simpler collections of "logical" channels, such as a broadcast channel 122 and an assignment or activity channel 124, multiplexed together onto a "physical" channel 126. Any of the radio channels of system 100 may serve as the control channel when not active as a working channel. As explained in the background section of the present invention, under prior art techniques, each respective terminal on the communication system would decode the control channel, and then evaluate or process only "my messages". That is, each respective terminal would only evaluate messages that are specifically directed or addressed to that terminal, and would discard all messages not addressed to that terminal. The inventor of the present invention has recognized, however, that such previously discarded information can be advantageously used to give a measure or indication of the system loading by observing the activity level on the control channel. As discussed above, the two primary states indicative of system loading are working channel loading and/or control channel loading. By utilizing previously discarded control channel information, an estimation of these two loading states, such as may be performed by a system-loading estimator 202 (FIG. 5), part of a processor 200 in each user terminal, can be utilized by the terminal to systematically provide a more precise differentiation between critical and non-critical call loading handling. As will be appreciated by those skilled in the art, to provide an optimal measure or estimate, the system-loading estimator should be generically configured to yield adequate accuracy for the intended application of the system-loading information, as well as being relatively computationally straightforward since the terminals typically have limited computational power and code space. The two primary loading states and their respective measures are discussed in more detail below.

On the one hand, working-channel loading generally becomes problematic when a communication request is made and no working channel is available for assignment. This type of loading tends to occur for relatively long durations, such as on the order of minutes to hours during peak loading times. A typical communications system in common situations will respond to an access request as follows: communicating to the terminal that no resource is available; trying again later; or queuing the caller and granting the request once a channel becomes available. For simplicity, either of these situations will be referred to as a "queued-call assignment". A standard terminal would typically only pay attention to a queued-call assignment that is directed towards that terminal after a call request is made. However, in accordance with aspects of the present invention, monitoring each valid queued-call assignment regardless of the originator/destination can be an adequate and straightforward estimator as to the state of the working channel loading. For example, if a certain threshold of queued calls assignments is crossed or exceeded over a given period of time, e.g., over one minute, or any other period of time appropriate for a given application, then a termination of the non-critical communications can be performed and these calls can remain inactive for a relatively long period measured from the last threshold crossing.

On the other hand, control-channel loading generally occurs when the number of call request attempts made cannot be maintained by the signaling protocol of the system. Control-channel loading contention is typically a bottleneck on communications on the order of seconds to minutes, and is thus much more dynamic that the working-channel contention. For a typical slotted ALOHA control channel the maximum sustainable call request attempt rate is approximately 36% of the slot rate. Thus, on an exemplary EDACS system with a 30 msec slot, the maximum sustainable call request attempt rate is approximately 12 calls per second. If an adequate and straightforward measure or estimate of the control-channel loading can be obtained, then an appropriate threshold of this loading can be established and processed relative to the control-channel loading to determine, for example, when to use a backup mechanism for non-critical communications. As will be apparent by those skilled in the art, certain desirable features of this measure or estimation are noteworthy: 1) The measure or estimate should be able to indicate the loading over periods of several seconds in order to smooth out the relatively short term dynamic effects of the particular data transmission protocol being used, e.g., slotted ALOHA signaling; 2) should have an adequate response time to allow for the loading to quickly be reduced when the need arises; 3) should have adequate dynamic range; 4) should be a reasonably reliable measure; and 5) should not take up a large amount of terminal computational and/or hardware resources.

One conceivable measure for determining system loading could be the number of retries on a call request attempt. While this type of measure may serve some purpose in the scheme of control channel load estimation; this type of measure is believed to be somewhat unreliable (as propagation effects will cause retries more often than loading); this type of measure generally lacks sufficiently high dynamic range (the probability of retry is relatively low up until a point where the retry time is unacceptably long), and any individual terminal generally does not make call requests often enough to make short term load averaging or response time meaningful. In view of the above, the inventor of the present invention recognized that other types of system-loading measures needed to be considered. For example, as suggested-above, the inventor recognized that system data that prior to the present invention has been usually ignored could be very useful for deriving an appropriate measure of system loading. For example, within certain constraints, the number of channel assignments on the outbound control channel per second can be used to provide an adequate measure of inbound control channel loading. Presently, user terminals would only respond to channel assignments that are directed specifically to them. However, in accordance with aspects of the invention, the terminal would now monitor all control channel assignments to estimate the control channel loading. For example, a radio channel monitor 203 (FIG. 5) is configured in processor 200 to monitor the control channel in a respective terminal. As suggested above, the control channel includes logical messages therein, such as activity and broadcast logical messages. The monitor 203 is further configured to monitor logical messages in the control channel regardless of whether or not the logical messages therein are specifically addressed to that terminal. Some exemplary measures or estimates of system loading in accordance with aspects of the invention are discussed in greater detail below.

As suggested above in the context of FIGS. 2–4, messages on the control channel are generally divided into ACTIVITY messages and BROADCAST messages. As an example of possible estimate implementations, consider the following estimating of a parameter indicative of system loading by computing an average estimate over a predefined window:

In one exemplary embodiment, a direct windowed average may take the form of:

$$SystemLoadingestimate = \frac{\text{ACTIVITY messages}}{\text{ACTIVITY messages} + \text{BROADCAST messages}}.$$

For example, FIG. 2 illustrates a condition where the number of ACTIVITY messages is zero, and thus the system-loading estimate is equal to zero. FIG. 3 illustrates a condition where the number of ACTIVITY channels is three and the number of BROADCAST messages is five, and thus, in this example, the system loading estimate is equal to 37.5% of full system loading capacity. FIG. 4 illustrates a condition where the number of ACTIVITY channels is seven and the number of BROADCAST messages is one, and thus, in this example, the system loading estimate is equal to 87.5% of full system loading capacity.

In another exemplary embodiment, the estimating of the parameter indicative of system loading comprises computing a sliding average, such as the following exponential integrator estimation:

$$presentSystemLoadingEstimate = sample + \alpha \cdot previousSystemLoadingEstimate$$

wherein sample represents a binary variable having a value of unity when the present logical message is an activity message, and having a value of zero when the present logical message is a broadcast message, and $\alpha$ represents a constant multiplier having a positive value less than unity, which determines the number of slots, i.e., the amount of time, the result is smoothed over.

It will be appreciated by those skilled in the art that the choice of which particular messages are categorized as being ACTIVITY messages or not is dependant upon the specific system being monitored. In one exemplary embodiment, it was determined that such category should include at least channel assignments, and specific terminal initiated transactions, such as registration information. For readers desiring further background information regarding exemplary types of control signaling messages that may be used in a trunked radio communication system, see, for example, U.S. Pat. No. 5,483,670, which is herein incorporated by reference.

Upon having derived accurate system loading information, many applications will now become apparent, such as the examples described below:

The system-loading information can be used to dynamically adjust the repetition rate (and thus the overall system loading) of certain lower priority network transactions, such as status messages, vehicle location updates, low priority data transfers, etc.

In any multiple access system, where access attempts can be lost (e.g., due to collision with another user terminal's attempt, or poor environmental conditions), the terminal will generally make a decision to retry the access attempt after some preset period with no detected response from the system. However, if this were indeed a collision and a constant period between retries were used then the two terminals would collide endlessly. To avoid this, present designs use a pseudo-random period to spread retry attempts.

In one aspect of the present invention detailed here, this pseudo-random delay is adjusted with a loading-dependant factor. This suggests that during periods of light loading the system essentially behaves as a standard system would behave. However, as the system-loading increases, the period of time between retries increases, spreading out the probability of collisions.

$$DelayAfterCollision = PseudoRandomDelay + \beta \cdot SystemLoading$$

Wherein β is a constant multiplier that may be determined analytically, experimentally and/or empirically for a particular system control channel structure.

Further, the system-loading information may allow for greater system efficiencies by using that information in the manner of a blocking filter. That is, if the system loading is greater than a predefined threshold, decision logic would treat such a condition as a collision without even attempting a transmission, and would force a delayed retry to occur.

Figure 5:
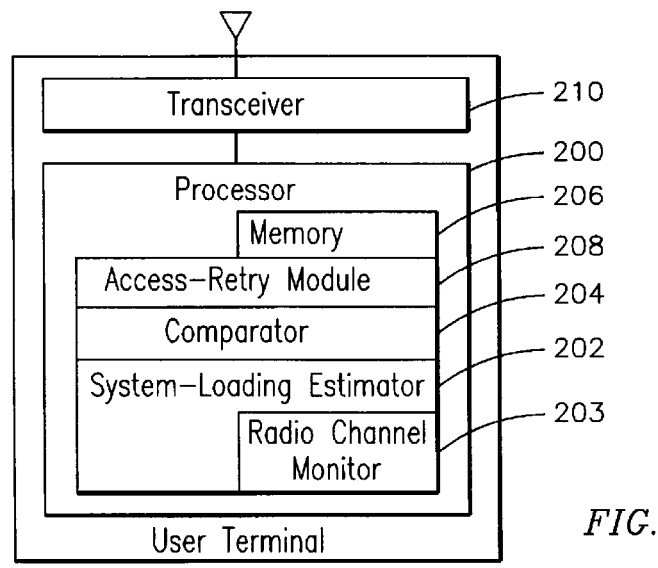
FIG. 5 illustrates an exemplary processor that may be used for calculating a parameter indicative of system loading in accordance with aspects of the present invention, and which indication may be processed for influencing various communication transactions based on the value of the system-loading parameter.

As shown in FIG. 5, the processor 200 further include a comparator 204 configured to process the system-loading estimate from estimator 202 to compare the system-loading estimate against the predefined threshold, such as may be stored in a memory 206. The decision logic may be programmed in an access retry module 208 so that when the system-loading is greater than the predefined threshold, the decision logic would assign a collision without attempting a transmission through transceiver 210. It will be appreciated that the processor structure for performing the operational interrelationships of the present invention may comprise processor-readable code in lieu of any specific hardware modules since those skilled in the art will appreciate that such operational interrelationships may be performed equally effective by way of software and/or hardware.

Figure 6:
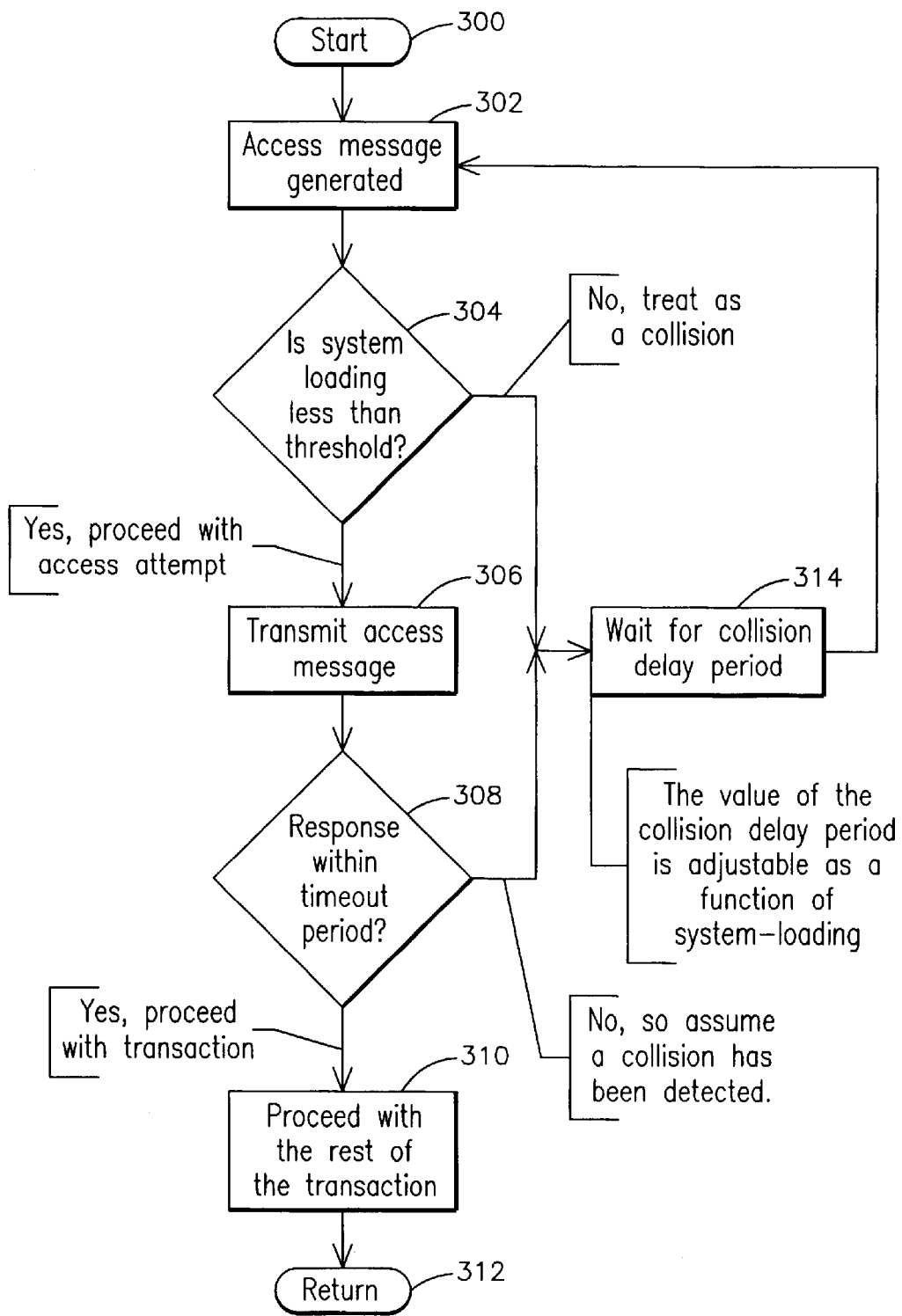
FIG. 6 is a flow chart depicting exemplary actions that in accordance with aspects of the present invention may be used for generating an access message based on the level of system loading.

FIG. 6 illustrates a flow chart of exemplary actions that in accordance with aspects of the present invention may be used for access message generation based on the level of system loading. Subsequent to starting step 300, step 302 allows for an access message to be generated using techniques well understood by those skilled in the art. Step 304 allows comparing the estimated system loading against a predefined system-loading threshold. If the estimate of the system loading is less that the threshold value, then, as shown at block 306, the access message is transmitted. As shown at decision block 308, assuming an appropriate response is received within a predefined timeout period, then, the terminal will proceed, as shown at block 310, with a given communication transaction, prior to return step 312. If, however, the response is not received within the timeout period, then the terminal will assume that a collision has been detected, and the process will proceed to block 314 to wait for a period of time that varies as a function of the system loading before attempting a new transmission of the access message. For example, the duration of the collision delay period may be proportional to the system loading so that a system experiencing heavy loading will impart a relatively longer wait in block 314, as opposed to a system experiencing relatively less load. If the comparison results in block 304 indicate that the value of system loading exceeds the threshold value, once again, the terminal will interpret this condition as a collision, and would only attempt to transmit the access message, after a waiting a period of time that varies as a function of the system loading, as previously explained. After waiting at a block 314 for the selected collision delay period, a new iteration for access message generation will resume at block 302.

The system-loading information may be further used to influence the choice of system selection, e.g., local network selection, when scanning between several local network systems, causing the selection of a system that, for example, while it may have some relatively lower signal level, also has a sufficiently low level of activity, so as to give on balance better overall service.

In standard exemplary implementations, system or site selection is generally performed using a measure of the signal level, the radio signal strength indicator (RSSI), which typically is a measure of the base station power, as sensed by the terminal. When the level of an adjacent site increases to a predefined value relative to the present base station level, the terminal will change over and use this new station. Thus, in accordance with another aspect of the present invention, one can use the system-loading information as an additional factor that influences the radio to choose a different site if the one site it is presently in communication with becomes substantially loaded. It is noted that in some communications systems, e.g., present EDACS implementation, it would be difficult to accurately evaluate the new site's system loading, due to the relatively small amount of time that the terminal would be able to listen to the remote control channel.

The present invention can be embodied in the form of processor-implemented processes and apparatus for practicing those processes. The present invention can also be embodied in the form of software or computer program code including processor-readable instructions embodied in tangible media, such as flash memory, floppy diskettes, CD-ROMs, hard drives, or any other computer-readable storage medium, wherein, when the computer program code is loaded into and executed by a computer or digital signal processor (DSP), the computer, or DSP, becomes an apparatus for practicing the invention. When implemented on a computer or DSP, the computer program code segments configure the computer or DSP to create specific logic circuits or processing modules. While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for determining loading of a communications system shared by a plurality of user-terminals, the method comprising:

monitoring, by a respective terminal, of a control channel including logical messages therein, the monitoring of the messages in the control channel being performed regardless of whether or not the logical messages therein are specifically addressed to that terminal, wherein the logical messages are selected from the group consisting of activity and broadcast messages; and estimating a parameter indicative of system loading based on information in the monitored logical messages, wherein the estimating of the parameter indicative of system loading comprises computing an average over a predefined window, wherein the computing of the average over the predefined window is based on the following equation:

$$SystemLoading estimate = \frac{\text{ACTIVITY messages}}{\text{ACTIVITY messages} + \text{BROADCAST messages}}.$$

2. The method of claim 1 where the estimated system loading is processed to dynamically adjust the repetition rate of lower priority communication transactions.

3. The method of claim 1 wherein, in the event an initial access request by the terminal is unsuccessful, the estimated system loading is processed to adjust the time for retrying a system access.

4. The method of claim 1 further comprising providing a system-load threshold.

5. The method of claim 4 further comprising comparing the system-load estimate relative to the system-load threshold so that in the event the threshold is exceeded, executing a block of system access by the terminal.

6. The method of claim 1 wherein, in the event the system being presently used needs a backup system, the estimated system loading is used for influencing the selection of a backup communication system.

7. The method of claim 1 further comprising monitoring a respective working channel including each queued-call assignment therein regardless of originator and/or destination to generate an estimation of working-channel loading.

8. A method for determining loading of a communications system shared by a plurality of user-terminals, the method comprising:

monitoring, by a respective terminal, of a control channel including logical messages therein, the monitoring of the messages in the control channel being performed regardless of whether or not the logical messages therein are specifically addressed to that terminal; and estimating a parameter indicative of system loading based on information in the monitored logical messages, wherein the estimating of the parameter indicative of system loading comprises computing a sliding average, wherein the computing of the sliding average is based on the following equation:

presentSystemLoadingEstimate=sample+α•previousSystemLoadingEstimate wherein sample represents a variable having a value of unity when the present logical message is an activity message, and having a value of zero when the present logical message is a broadcast message, and α represents a multiplier having a positive value less than unity.

9. The method of claim 8 where the estimated system loading is processed to dynamically adjust the repetition rate of lower priority communication transactions.

10. The method of claim 8 wherein, in the event an initial access request by the terminal is unsuccessful, the estimated system loading is processed to adjust the time for retrying a system access.

11. The method of claim 8 further comprising providing a system-load threshold.

12. The method of claim 11 further comprising comparing the system-load estimate relative to the system-load threshold so that in the event the threshold is exceeded, executing a block of system access by the terminal.

13. The method of claim 8 wherein, in the event the system being presently used needs a backup system, the estimated system loading is used for influencing the selection of a backup communication system.

14. The method of claim 8 further comprising monitoring a respective working channel including each queued-call assignment therein regardless of originator and/or destination to generate an estimation of working-channel loading.

15. A processor for determining loading of a communications system shared by a plurality of user-terminals, the processor comprising:

a radio channel monitor configured to monitor in a respective terminal a control channel, the control channel including logical messages therein, the monitor further configured to monitor the logical messages in the control channel regardless of whether or not the logical messages therein are specifically addressed to that terminal, wherein the logical messages are selected from the group consisting of activity and broadcast messages; and an estimator configured to estimate a parameter indicative of system loading based on information supplied by the monitor, wherein the estimating of the parameter indicative of system loading comprises computing an average over a predefined window, wherein the computing of the average over the predefined window is based on the following equation:

$$SystemLoadingestimate = \frac{\text{ACTIVITY messages}}{\text{ACTIVITY messages} + \text{BROADCAST messages}}.$$

16. The processor of claim 15 where the estimated system loading is processed to dynamically adjust the repetition rate of lower priority communication transactions.

17. The processor of claim 15 wherein, in the event an initial access request by the terminal is unsuccessful, the estimated system loading is processed to adjust the time for retrying a system access.

18. The processor of claim 15 further comprising memory for storing a system-load threshold.

19. The processor of claim 18 further comprising a comparator configured to compare the system-load estimate relative to the system-load threshold so that in the event the threshold is exceeded, executing a block of system access by the terminal.

20. The processor of claim 15 wherein, in the event the system being presently used needs a backup system, the estimated system loading is processed for influencing the selection of the backup communication system.

21. The processor of claim 15 wherein the radio channel monitor is further configured to monitor a respective working channel including each queued-call assignment therein regardless of originator and/or destination to generate an estimation of working-channel loading.

22. A processor for determining loading of a communications system shared by a plurality of user-terminals, the processor comprising:

a radio channel monitor configured to monitor in a respective terminal a control channel, the control channel including logical messages therein, the monitor further configured to monitor the logical messages in the control channel regardless of whether or not the logical messages therein are specifically addressed to that terminal; and an estimator configured to estimate a parameter indicative of system loading based on information supplied by the monitor, wherein the estimating of the parameter indicative of system loading comprises computing a sliding average, wherein the computing of the sliding average is based on the following equation:

presentSystemLoadingEstimate=sample+α•previousSystemLoadingEstimate wherein sample represents a variable having a value of unity when the present logical message is an activity message, and having a value of zero when the present logical message is a broadcast message, and α represents a multiplier having a positive value less than unity.

23. The processor of claim 22 where the estimated system loading is processed to dynamically adjust the repetition rate of lower priority communication transactions.

24. The processor of claim 22 wherein, in the event an initial access request by the terminal is unsuccessful, the estimated system loading is processed to adjust the time for retrying a system access.

25. The processor of claim 22 further comprising memory for storing a system-load threshold.

26. The processor of claim 25 further comprising a comparator configured to compare the system-load estimate relative to the system-load threshold so that in the event the threshold is exceeded, executing a block of system access by the terminal.

27. The processor of claim 22 wherein, in the event the system being presently used needs a backup system, the estimated system loading is processed for influencing the selection of the backup communication system.

28. The processor of claim 22 wherein the radio channel monitor is further configured to monitor a respective working channel including each queued-call assignment therein regardless of originator and/or destination to generate an estimation of working-channel loading.

* * * * *